(12) United States Patent
Kitao

(10) Patent No.: US 9,292,242 B2
(45) Date of Patent: Mar. 22, 2016

(54) IMAGE FORMING APPARATUS

(71) Applicant: KYOCERA Document Solutions Inc., Osaki-shi, Osaka (JP)

(72) Inventor: Tomoyuki Kitao, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/520,396

(22) Filed: Oct. 22, 2014

(65) Prior Publication Data

US 2015/0116768 A1   Apr. 30, 2015

(30) Foreign Application Priority Data

Oct. 28, 2013   (JP) .................... 2013-222998

(51) Int. Cl.
*G06F 3/12*   (2006.01)
(52) U.S. Cl.
CPC ............ *G06F 3/1236* (2013.01); *G06F 3/1221* (2013.01); *G06F 3/1292* (2013.01)
(58) Field of Classification Search
CPC ... G03G 15/5004; G06F 1/263; G06F 1/3284; G06F 3/1229; G06F 3/1236; G06F 3/1221; G06F 3/1292; Y02B 60/1267; Y02B 60/1271; Y02B 60/50

USPC .................................... 358/1.1, 1.15
See application file for complete search history.

(56) References Cited

U.S. PATENT DOCUMENTS

2013/0258372 A1* 10/2013 Murray et al. ................ 358/1.13
2013/0332639 A1* 12/2013 Jiang .................... G06F 13/4022
                                                          710/300

FOREIGN PATENT DOCUMENTS

JP        2012-147396        8/2012

* cited by examiner

*Primary Examiner* — Iriana Cruz
(74) *Attorney, Agent, or Firm* — Gerald E. Hespos; Michael J. Porco; Matthew T. Hespos

(57) ABSTRACT

A wireless communication unit includes a low-speed communication IF and a high-speed communication IF. A controller includes a low-speed communication IF and a high-speed communication IF. The low-speed communication IFs are SDIO communication IFs and the high-speed communication IFs are USB communication IFs. The controller switches SDIO and USB according to a state of an image forming apparatus.

6 Claims, 7 Drawing Sheets

FIG. 2

|  | USB | SDIO |
|---|---|---|
| POWER CONSUMPTION | × | ○ |
| COMMUNICATION SPEED | ○ | × |
| RETURN FROM SLEEP | × | ○ |

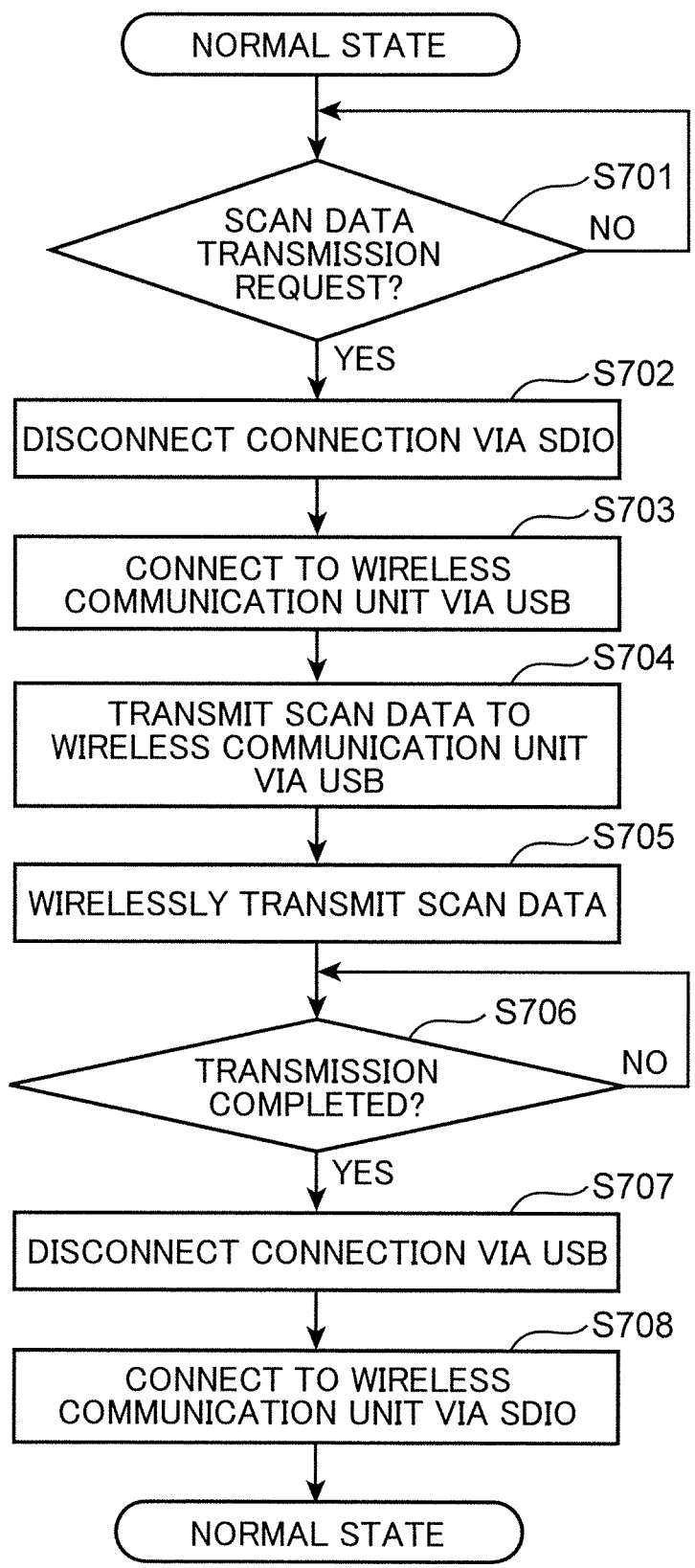

IMAGE FORMING APPARATUS

INCORPORATION BY REFERENCE

This application is based on Japanese Patent Application No. 2013-222998 filed with the Japan Patent Office on Oct. 28, 2013, the contents of which are hereby incorporated by reference.

BACKGROUND

The present disclosure relates to an image forming apparatus which carries out wireless communication with an external apparatus.

A wireless LAN function is generally equipped in an image forming apparatus. In a general method for equipping a wireless LAN function, a substrate called a wireless LAN module is prepared and communicably connected to a main controller of the image forming apparatus. There are several communication systems between the wireless LAN module and the main controller. For example, communication systems such as PCIe (PCI (Peripheral Component Interconnect) Express), USB (Universal Serial Bus) and SDIO (Secure Digital Input/Output) are known. These differ in communication speed and power consumption and selectively used according to purpose and usage.

For example, if PCIe is used, a high data transfer rate can be expected, but power consumption increases. Further, if SDIO is used, power consumption can be reduced, but a data transfer rate is slowed. If a transfer rate between the wireless LAN module and the main controller is slowed, it causes a reduction in the performance of printing and scanning operations using the wireless LAN and a problem of impairing user convenience.

As a method for solving this problem, there is a technology for reducing unnecessary power consumption by using, for example, SDIO as a communication system and changing a communication frequency of SDIO in accordance with a wireless communication speed.

SUMMARY

An image forming apparatus according to one aspect of the present disclosure includes a wireless communication unit for wirelessly transmitting and receiving data to and from an external apparatus and a controller for communicating with the wireless communication unit. The wireless communication unit and the controller include a plurality of communication interfaces for communication via a plurality of communication systems having different communication speeds. The wireless communication unit and the controller select one of the plurality of communication systems according to a state of the image forming apparatus.

These and other objects, features and advantages of the present disclosure will become more apparent upon reading the following detailed description along with the accompanying drawings.

BRIEF DESCRIPTION OF THE DRAWINGS

FIG. 2 is a table compiling characteristics of USB and SDIO, FIG. 7 is a flow chart showing a process of the image forming apparatus in the normal state in the case of employing the second technique.

DETAILED DESCRIPTION

Figure 1:
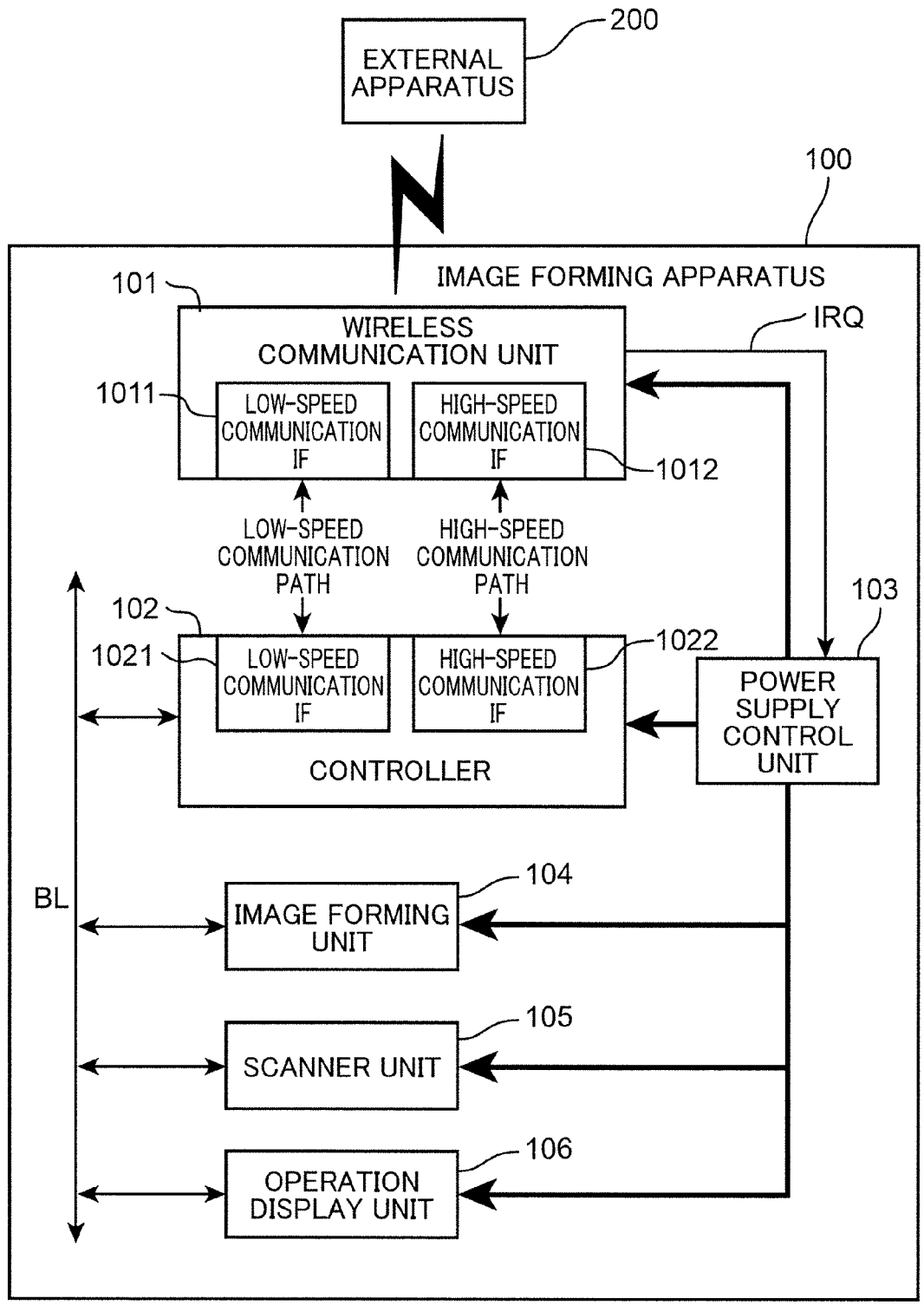
FIG. 1 is a block diagram of an image forming apparatus according to an embodiment of the present disclosure.

FIG. 1 is a block diagram of an image forming apparatus 100 according to an embodiment of the present disclosure. Any image forming apparatus may be employed as the image forming apparatus 100 provided that it has a wireless communication function. For example, an MFP (Multifunction Peripheral), a copier, a facsimile machine or the like can be employed.

The image forming apparatus 100 includes a wireless communication unit 101, a controller 102, a power supply control unit 103, an image forming unit 104, a scanner unit 105 and an operation display unit 106. In FIG. 1, thick lines indicate power lines and thin lines indicate data lines. The controller 102, the image forming unit 104, the scanner unit 105 and the operation display unit 106 are connected to be capable of communicating with each other via a bus line BL. Further, the wireless communication unit 101, the controller 102, the image forming unit 104, the scanner unit 105 and the operation display unit 106 are powered on and off by the power supply control unit 103.

The wireless communication unit 101 is configured, for example, by a wireless LAN communication module and transmits and receives data to and from an external apparatus 200 using a wireless LAN communication protocol. For example, IEEE802.11a, IEEE802.11g or IEEE802.11b can be employed as the wireless LAN communication protocol. Further, power is constantly supplied to the wireless communication unit 101 from the power supply control unit 103 regardless of a sleep state and a normal state.

The controller 102 is configured, for example, by a microcontroller or a dedicated hardware circuit, and controls the entire image forming apparatus 100. The controller 102 is so connected to the wireless communication unit 101 that a low-speed communication system (an example of a first communication system) and a high-speed communication system (second communication system) faster than the low-speed communication system are switchable.

Here, USB, SDIO, PCIe and the like cited in the description of background are known as a communication system in transmitting and receiving data between the controller 102 and the wireless communication unit 101. In this embodiment, USB is employed as the high-speed communication system and SDIO is employed as the low-speed communication system. However, this is merely an example and two communication systems may arbitrarily be selected out of USB, SDIO and PCIe, the faster one may be employed as the high-speed communication system and the slower one may be employed as the low-speed communication system. Since a communication speed is generally high in the order of PCIe, USB and SDIO, PCIe may be employed as the high-speed communication system and USB or SDIO may be employed as the low-speed communication system.

The wireless communication unit 101 includes a low-speed communication interface (IF) 1011 and a high-speed communication IF 1012. Further, the controller 102 includes a low-speed communication IF 1021 and a high-speed communication IF 1022.

The low-speed communication IFs 1011 and 1021 are connected via a low-speed communication path and the high-speed communication IFs 1012 and 1022 are connected via a high-speed communication path. SDIO communication IFs are employed as the low-speed communication IFs 1011 and 1021, and USB communication IFs are employed as the high-speed communication IFs 1012 and 1022. An SDIO line is employed as the low-speed communication path and a USB line is employed as the high-speed communication path.

Each of the wireless communication unit 101 and the controller 102 selects either one of the communication systems USB and SDIO. Here, when receiving data from the external apparatus 200 in the case of connection to the controller 102 via SDIO, the wireless communication unit 101 transmits the received data to the controller 102 via the low-speed communication IF 1011. Further, when receiving data from the external apparatus 200 in the case of connection to the controller 102 via USB, the wireless communication unit 101 transmits the received data to the controller 102 via the high-speed communication IF 1012.

On the other hand, when transmitting data to the external apparatus 200 in the case of connection to the wireless communication unit 101 via SDIO, the controller 102 transmits the data to the wireless communication unit 101 via the low-speed communication IF 1021. Further, when transmitting data to the external apparatus 200 in the case of connection to the wireless communication unit 101 via USB, the controller 102 transmits the data to the wireless communication unit 101 via the high-speed communication IF 1022.

In the case of a switch from SDIO to USB, the controller 102 first transmits an SDIO data link disconnection request to the wireless communication unit 101 via the low-speed communication IF 1021. Then, the wireless communication unit 101 and the controller 102 transmit and receive data in accordance with a disconnection sequence of the SDIO data link and disconnect the SDIO data link. In this way, the connection between the wireless communication unit 101 and the controller 102 via SDIO is disconnected.

When the disconnection of the SDIO data link is completed, the controller 102 transmits a USB data link establishment request to the wireless communication unit 101 via the high-speed communication IF 1022. Then, the wireless communication unit 101 and the controller 102 transmit and receive data in accordance with an establishment sequence of the USB data link and establish the SDIO data link. In this way, the wireless communication unit 101 and the controller 102 are connected via USB.

On the other hand, in the case of a switch from USB to SDIO, the controller 102 first transmits a USB data link disconnection request to the wireless communication unit 101 via the high-speed communication IF 1022. Then, the wireless communication unit 101 and the controller 102 transmit and receive data in accordance with a disconnection sequence of the USB data link and disconnect the USB data link. In this way, the connection between the wireless communication unit 101 and the controller 102 via USB is disconnected.

Subsequently, the controller 102 transmits an SDIO data link establishment request to the wireless communication unit 101 via the low-speed communication IF 1021. Then, the wireless communication unit 101 and the controller 102 transmit and receive data in accordance with an establishment sequence of the SDIO data link and establish the SDIO data link. In this way, the wireless communication unit 101 and the controller 102 are connected via SDIO.

Note that although two types of communication IFs can be switched between the wireless communication unit 101 and the controller 102 in the configuration of FIG. 1, there is no limitation to this and the wireless communication unit 101 and the controller 102 may be so connected that three or more types of communication IFs can be switched. For example, it is assumed that three types of communication IFs of PCIe, USB and SDIO are employed as communication IFs between the wireless communication unit 101 and the controller 102. In this case, data transmitted and received by the wireless communication unit 101 is classified into first to third types of data determined in advance according to a data amount.

In the case of transmitting and receiving the first type of data from and by the wireless communication unit 101, the controller 102 is connected to the wireless communication unit 101 via PCIe. Further, in the case of transmitting and receiving the second type of data having a large data amount next to the first type of data from and by the wireless communication unit 101, the controller 102 is connected to the wireless communication unit 101 via USB. Further, in the case of transmitting and receiving the third type of data having a large data amount next to the second type of data from and by the wireless communication unit 101, the controller 102 may be connected to the wireless communication unit 101 via SDIO.

Further, the controller 102 outputs a transition instruction to the power supply control unit 103 when the image forming apparatus 100 is caused to transition from the normal state to the sleep state. Then, the power supply control unit 103 turns off switching elements provided on power lines connecting the power supply control unit 103 to the controller 102, the image forming unit 104, the scanner unit 105 and the operation display unit 106 to power off the controller 102, the image forming unit 104, the scanner unit 105 and the operation display unit 106. In this way, only the power supply control unit 103 and the wireless communication unit 101 are on in the sleep state.

The power supply control unit 103 includes, for example, a power supply circuit for converting commercial power into a DC voltage of a level required by the image forming apparatus 100, a microcontroller and a dedicated hardware circuit. Further, the power supply control unit 103 receives the notification of an interrupt signal IRQ from the wireless communication unit 101 and recognizes the receipt of data by the wireless communication unit 101 when the wireless communication unit 101 receives the data in the case where the image forming apparatus 100 is in the sleep state. Then, when recognizing the receipt of the data by the wireless communication unit 101 in the sleep state, the power supply control unit 103 powers on the controller 102 and causes the controller 102 to process the data received by the wireless communication unit 101.

The image forming unit 104 forms an image on a recording sheet under the control of the controller 102. Here, the image forming unit 104 includes, for example, an image carrier, an exposure device for forming an electrostatic latent image corresponding to print data by irradiating the image carrier with laser light, a developing device for forming a toner image of an electrostatic latent image formed on the image carrier, a fixing device for fixing a toner image on a recording sheet, and the like.

The scanner unit 105 reads a document and generates image data. Here, the scanner unit 105 includes, for example, a light source for emitting light to a document and an image sensor for receiving reflected light from a document. A CCD line sensor or a CMOS line sensor is employed as the image sensor.

The operation display unit 106 is, for example, composed of a touch panel and operation buttons and receives an operation instruction from a user.

The external apparatus 200 is configured by an information processing apparatus connected to be capable of wireless communication with the image forming apparatus 100. Here, data to be transmitted by the external apparatus 200 includes print data, a status information read request and the like. Further, the external apparatus 200 receives various pieces of data transmitted in the form of radio signals from the image forming apparatus 100. Here, data to be received by the external apparatus 200 include scan data, a response to the status information read request and the like.

FIG. 2 is a table compiling characteristics of USB and SDIO. USB is characterized by having a wider communication band than SDIO and being capable of high-speed communication, but having large power consumption. A case where the wireless communication unit 101 and the controller 102 are connected only via USB is studied. When a return is made from the sleep state to the normal state, the controller 102 is powered on from off. At this time, it takes time for the return since initial communication needs to be carried out in USB. Conversely, if the wireless communication unit 101 and the controller 102 are connected only via SDIO, a communication speed is slower than with USB since SDIO is superior to USB in power consumption, but has a narrower communication band than USB.

To combine a reduction of power consumption and the ensuring of the communication speed, two communication systems of USB and SDIO are switched according to the state of the image forming apparatus 100 and the content of data transmitted and received by wireless communication. An example is described below. In this embodiment, there are two techniques, i.e. first and second techniques, as a communication system switching technique. First, the first technique is described.

(First Technique)

Figure 3:
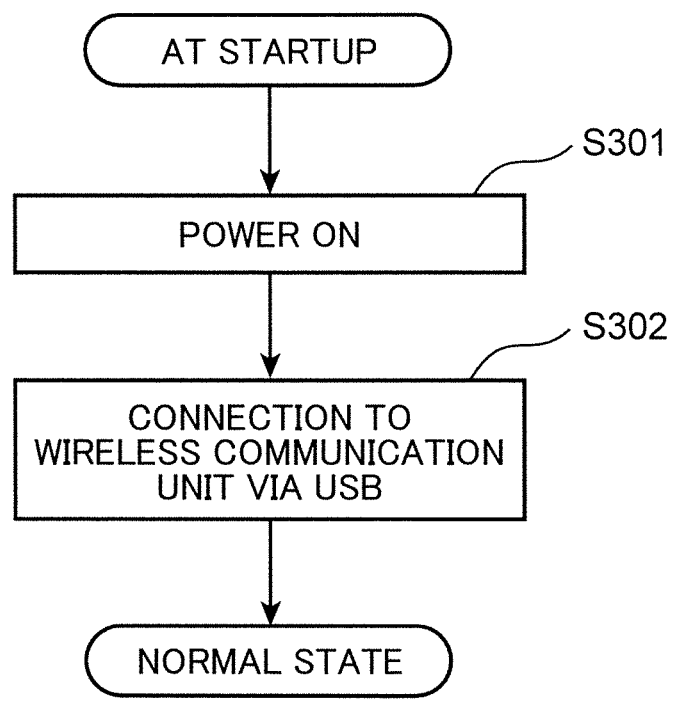
FIG. 3 is a flow chart showing a process when the image forming apparatus is started in the case of employing a first technique.

The first technique is a technique for connecting the wireless communication unit 101 and the controller 102 via USB at startup and connecting the wireless communication unit 101 and the controller 102 via SDIO when the image forming apparatus 100 transitions to the sleep state. FIG. 3 is a flow chart showing a process when the image forming apparatus 100 is started in the case of employing the first technique as the communication system switching technique.

First, when a main power supply of the image forming apparatus 100 is turned on, the power supply control unit 103 powers on the wireless communication unit 101, the controller 102, the image forming unit 104, the scanner unit 105 and the operation display unit 106 (S301). Subsequently, the controller 102 is connected to the wireless communication unit 101 via USB (S302). In this way, the image forming apparatus 100 enters the normal state.

Figure 4:
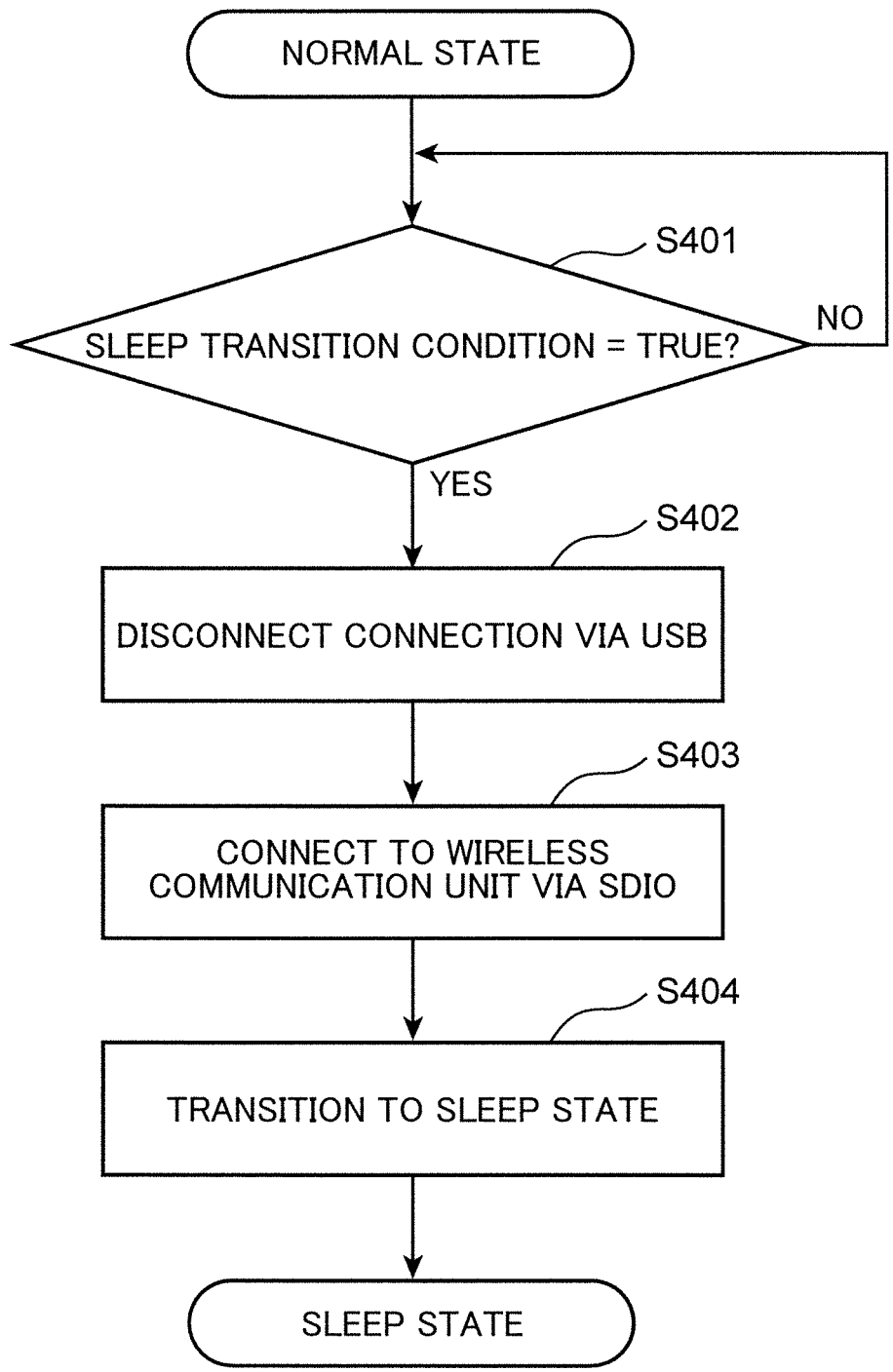
FIG. 4 is a flow chart showing a process when a transition is made from a normal state to a sleep state in the case of employing the first technique.

FIG. 4 is a flow chart showing a process when a transition is made from the normal state to the sleep state in the case of employing the first technique. First, when a sleep transition condition becomes true in the normal state (YES in S401), the controller 102 is disconnected from the connection to the wireless communication unit 101 via USB (S402). On the other hand, unless the sleep transition condition is true (NO in S401), the process is returned to S401.

Here, the sleep transition condition becomes true, for example, when a state where the image forming apparatus 100 does not perform any processing continues for a given period of time, specifically when a processing is performed in none of the image forming unit 104, the scanner unit 105 and the operation display unit 106 for the given period of time.

Subsequently, the controller 102 is connected to the wireless communication unit 101 via SDIO (S403). Subsequently, the controller 102 notifies a transition instruction to the sleep state to the power supply control unit 103 and causes the power supply control unit 103 to power off the controller 102, the image forming unit 104, the scanner unit 105 and the operation display unit 106, whereby a transition is made to the sleep state (S404).

According to the processes of FIGS. 3 and 4, the controller 102 is connected to the wireless communication unit 101 via USB at startup and switches the connection to the wireless communication unit 101 from that via USB to that via SDIO when the image forming apparatus 100 transitions to the sleep state.

Figure 5:
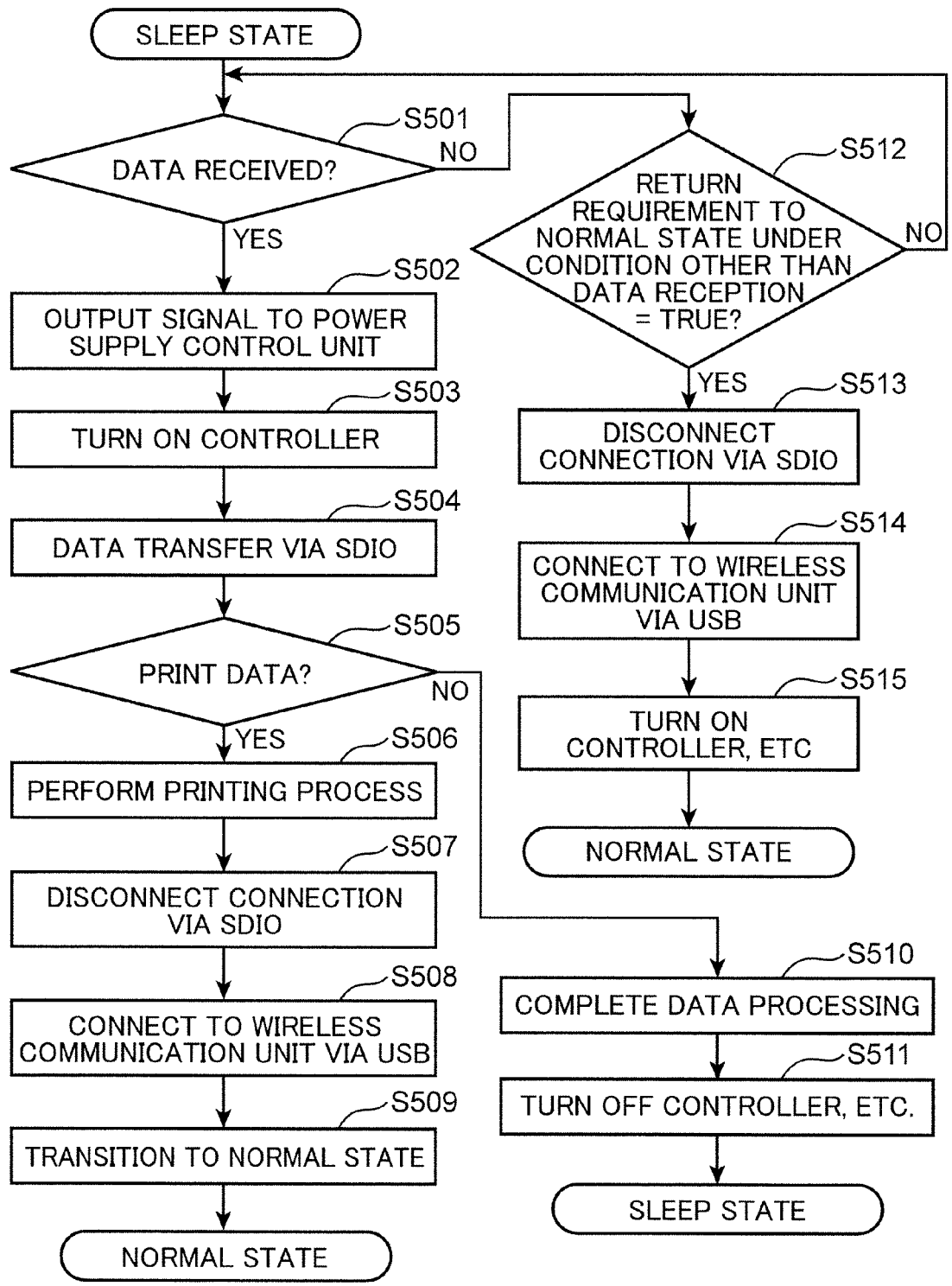
FIG. 5 is a flow chart showing a process when a transition is made from the sleep state to the normal state in the case of employing the first technique.

FIG. 5 is a flow chart showing a process when a transition is made from the sleep state to the normal state in the case of employing the first technique. First, when wireless data is received from the external apparatus 200 (YES in S501), the wireless communication unit 101 outputs an interrupt signal IRQ to the power supply control unit 103 (S502). Subsequently, the power supply control unit 103 powers on the controller 102 (S503). Subsequently, the wireless communication unit 101 transmits data received via SDIO to the controller 102 (S504). Subsequently, the controller 102 causes the image forming unit 104 to perform a printing process (S506) if the data received in S501 is print data (YES in S505). In this case, the controller 102 causes the power supply control unit 103 to power on the image forming unit 104 prior to the printing process.

Subsequently, the controller 102 disconnects the connection to the wireless communication unit 101 via SDIO (S507). Subsequently, the controller 102 is connected to the wireless communication unit 101 via USB (S508). In this way, the connection between the controller 102 and the wireless communication unit 101 is switched from that via SDIO to that via USB.

Subsequently, the controller 102 outputs a return instruction to the normal state to the power supply control unit 103 and causes the image forming apparatus 100 to transition to the normal state (S509). In this case, when receiving the return instruction, the power supply control unit 103 causes the image forming apparatus 100 to transition to the normal state by powering on the powered-off scanner unit 105 and operation display unit 105.

In this way, in the case of successively printing the print data, the second and subsequent print data can be processed at a high speed since it is transmitted from the wireless communication unit 101 to the controller 102 via USB. Note that the first print data is transmitted from the wireless communication unit 101 to the controller 102 via SDIO (S504). If it is attempted to transmit the first print data from the wireless communication unit 101 to the controller 102 via USB, a switching process from SDIO to USB is performed and the processing of the first print data is delayed. Accordingly, in this embodiment, the first print data is transmitted from the wireless communication unit 101 to the controller 102 via SDIO.

If the data received by the wireless communication unit 101 is not print data in S505 (NO in S505), the controller 102 processes that data (S510). The data that is not the print data may be, for example, a request to read status information from a processing unit. Various pieces of information managed by the respective processing units fall under the status information. For example, in the case of the image forming unit 104, a remaining toner amount and the number of prints fall under the status information.

For example, if the status information is a request to read the status information of the image forming unit 104, the controller 102 reads the status information from the image forming unit 104 and transmits it to the wireless communication unit 101 via SDIO after causing the power supply control unit 103 to power off the image forming unit 104. The wireless communication unit 101 having received the status information converts the status information into a radio signal and transmits the radio signal to the external apparatus 200.

Subsequently, the controller 102 causes the power supply control unit 103 to turn off the controller 102 and the processing units in an on-state (S511) and returns the process to S501. For example, in the case of turning on the image forming unit 104 to read the status information, the power supply control unit 103 turns off the image forming unit 104 and the controller 102. Note that the power supply control unit 103 may power off only the controller 102 when only the controller 102 is powered on to read the status information of the controller 102.

Unless the data received by the wireless communication unit 101 is print data, it is often data such as a status information read request. In this case, it is not necessary to power on all the processing units and return the image forming apparatus 100 from the sleep state to the normal state. Accordingly, in this embodiment, the controller 102 does not switch the connection to the wireless communication unit 101 from that via SDIO to that via USB unless the data received by the wireless communication unit 101 is print data. In this way, power consumption can be reduced.

If NO is determined in S501 and the wireless communication unit 101 satisfies a return requirement to the normal state under a condition other than that the wireless communication unit 101 receives data (YES in S512), the controller 102 disconnects the connection to the wireless communication unit 101 via SDIO (S513). YES is determined in S512, for example, when a return key provided in the operation display unit 106 is operated by the user, when the communication IF other than the wireless communication unit 101 (e.g. communication IF of a wired LAN) receives data or when the operation display unit 106 receives a copy start instruction from the user.

Subsequently, the controller 102 is connected to the wireless communication unit 101 via USB (S514). Subsequently, the controller 102 causes the power supply control unit 103 to power on all the processing units in an off-state (S515). Here, the image forming unit 104, the scanner unit 105 and the operation display unit 106 are powered on. Since the wireless communication unit 101 and the controller 102 are connected via USB in this way, high-speed communication between the wireless communication unit 101 and the controller 102 can be realized.

On the other hand, the process is returned to S501 if NO in S512, i.e. the return requirement to the normal state is not satisfied under the condition other than data reception by wireless communication.

In the first technique, importance is attached to ensuring the communication speed between the wireless communication unit 101 and the controller 102 since the wireless communication unit 101 and the controller 102 are connected via USB in the normal state. On the other hand, importance is attached to a reduction of power consumption in the sleep state since the connection between the wireless communication unit 101 and the controller 102 is switched from that via USB to that via SDIO before a transition to the sleep state when a transition is made from the normal state to the sleep state.

(Second Technique)

The second technique is a technique for connecting the wireless communication unit 101 and the controller 102 via SDIO at startup and switching the connection between the wireless communication unit 101 and the controller 102 from that via SDIO to that via USB when the wireless communication unit 101 transmits and receives high-speed communication data requiring USB. In the second technique, power consumption can be reduced since the wireless communication unit 101 and the controller 102 are connected via SDIO in the normal state.

Figure 6:
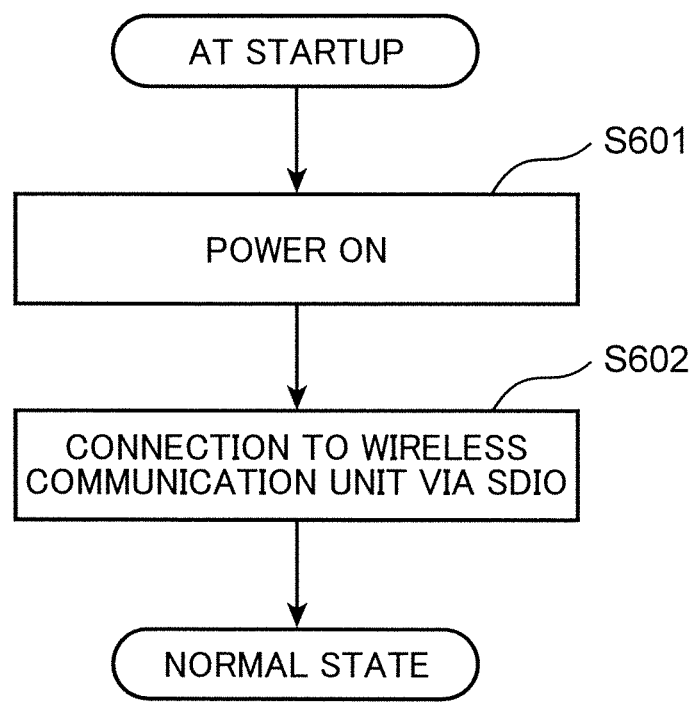
FIG. 6 is a flow chart showing a process when the image forming apparatus is started in the case of employing a second technique.

FIG. 6 is a flow chart showing a process when the image forming apparatus 100 is started in the case of employing the second technique as the communication system switching technique. 5601 is the same as S301 of FIG. 3. Subsequently, the controller 102 is connected to the wireless communication unit 101 via SDIO (S602). In this way, the image forming apparatus 100 enters the normal state.

FIG. 7 is a flow chart showing a process of the image forming apparatus 100 in the normal state in the case of employing the second technique.

First, when a scan data transmission request is received from the scanner unit 105 (YES in S701), the controller 102 disconnects the connection to the wireless communication unit 101 via SDIO (S702). For example, when the user sets a document in the scanner unit 105 and enters an instruction to start scanning and a transmission destination of scanned image data and these inputs are received by the operation display unit 106, the scanner unit 105 reads the document and generates image data of the document. Then, the scanner unit 105 transmits the generated image data and the instructed transmission destination as the scan data transmission request to the controller 102 via the bus line BL. In this way, the controller 102 receives the scan data transmission request.

On the other hand, the controller 102 returns the process to S701 unless the scan data transmission request is received (NO in S701).

Subsequently, the controller 102 is connected to the wireless communication unit 101 via USB (S703). Subsequently, the controller 102 transmits the scan data to the wireless communication unit 101 via USB (S704). Subsequently, the wireless communication unit 101 converts the scan data into a radio signal and transmits the radio signal to the external apparatus 200 as the transmission destination instructed by the user (S705).

Subsequently, the controller 102 disconnects the connection to the wireless communication unit 101 via USB (S707) when the transmission of the scan data by the wireless communication unit 101 is completed (YES in S706). Here, the controller 102 may detect the completion of the scan data transmission by receiving a transmission completion notification from the wireless communication unit 101. Subsequently, the controller 102 is connected to the wireless communication unit 101 via SDIO (S708).

In the second technique, the wireless communication unit 101 and the controller 102 are connected via SDIO at startup and the image forming apparatus 100 enters the normal state. When a transmission request to transmit predetermined high-speed communication data requiring the high-speed communication system such as scan data to the external apparatus 200 is issued, the controller 102 transmits the scan data to the wireless communication unit 101 after switching the connection to the wireless communication unit 101 from that via SDIO to that via USB. When the transmission of the scan data to the external apparatus 200 is completed, the connection between the wireless communication unit 101 and the controller 102 is returned to that via USB to that via SDIO. Thus, high-speed communication is realized when high-speed communication is required and, in other cases, power consumption can be reduced and a power control of the image forming apparatus 100 can be efficiently executed.

Note that although the scan data is illustrated as high-speed communication data, the present disclosure is not limited to this and any data transmitted to the external apparatus 200 by the image forming apparatus 100 and having a data amount exceeding a predetermined threshold value may be treated as high-speed communication data. Further, even scan data may not be treated as high-speed communication data if the data amount thereof is not larger than the predetermined threshold value. In this case, when data having a data amount not above the predetermined threshold value is transmitted to the external apparatus 200, the controller 102 may transmit the data to the wireless communication unit 101 in a state where the connection to the wireless communication unit 101 is maintained at the connection via SDIO.

Further, although the case of transmitting the data is illustrated in FIG. 7, the present disclosure is not limited to this and the second technique can be applied also in the case of receiving data. In this case, if the data received by the wireless communication unit 101 is print data, the controller 102 may receive the print data from the wireless communication unit 101 after the connection to the wireless communication unit 101 is switched from that via SDIO to that via USB. On the other hand, unless the data received by the wireless communication unit 101 is print data, the controller 102 may receive the data from the wireless communication unit 101 in the state where the connection to the wireless communication unit 101 is maintained at the connection via SDIO. In this case, it may be determined whether or not the data received by the wireless communication unit 101 is print data and a determination result may be notified to the controller 102. Note that the data that is received by the wireless communication unit 101 and not print data may be, for example, a status information read request.

Besides the first and second techniques described above, it can be also a switching technique to freely switch the communication systems of USB and SDIO according to need. For example, a first operation mode based on the use of USB and a second operation mode based on the use of SDIO are prepared. If no processing is performed for a given period of time in the image forming apparatus 100, the controller 102 switches from the first operation mode to the second operation mode. When detecting that the number of pieces of print data accumulated in a spooler (not shown) for temporarily holding the print data to be processed has reached a threshold value or larger, the controller 102 may switch from the second operation mode to the first operation mode.

Further, the controller 102 may switch the connection between the wireless communication unit 101 and the controller 102 to that via USB or to that via SDIO in accordance with a selection instruction entered using the operation display unit 106 by the user.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image forming apparatus, comprising:
a wireless communication unit for wirelessly transmitting and receiving data to and from an external apparatus; and
a controller for communicating with the wireless communication unit,
wherein the wireless communication unit and the controller include a plurality of communication interfaces for communication via a plurality of communication systems having different communication speeds and one of the plurality of communication systems is selected according to a state of the image forming apparatus, the wireless communication unit and the controller being connected via a plurality of communication paths corresponding to the plurality of communication systems,
the plurality of communication systems includes a first communication system and a second communication system faster than the first communication system; and
the controller is connected to the wireless communication unit via the second communication system at startup and switches connection to the wireless communication unit from that via the second communication system to that via the first communication system when the image forming apparatus transitions to a sleep state,
the image forming apparatus further comprising:
a power supply control unit for powering off the controller in the sleep state,
wherein, when the reception of data by the wireless communication unit is detected by the power supply control unit in the sleep state, the controller is powered on by the power supply control unit to receive the data from the wireless communication unit via the first communication system, and, in a case that the received data is configured by successive print data, to switch the connection with the wireless communication unit from that via the first communication system to that via the second communication system after a printing process of first print data is finished and to receive second and subsequent print data from the wireless communication unit via the second communication system.

2. An image forming apparatus according to claim 1, wherein:
the controller does not switch the connection to the wireless communication unit from that via the first communication system to that via the second communication system after a process of the data received from the wireless communication unit via the first communication system is finished unless the data is the print data.

3. An image forming apparatus according to claim 1, wherein:
the controller switches the connection to the wireless communication unit from that via the first communication system to that via the second communication system when a return is made from the sleep state to a normal state under a condition other than the reception of data by the wireless communication unit.

4. An image forming apparatus according to claim 1, wherein:
the plurality of communication systems includes a first communication system and a second communication system faster than the first communication system; and
the controller is connected to the wireless communication unit via the first communication system at startup and switches connection to the wireless communication unit from that via the first communication system to that via the second communication system when the wireless communication unit transmits predetermined high-speed communication data requiring a high-speed communication system.

5. An image forming apparatus according to claim 4, wherein:
the controller switches the connection to the wireless communication unit from that via the second communication system to that via the first communication system when the transmission and reception of the high-speed communication data are completed.

6. An image forming apparatus according to claim 1, wherein:
the plurality of communication systems are two or more communication systems selected among a USB, SDIO and PCIe.

* * * * *